United States Patent [19]
Kamp et al.

[11] 3,882,520
[45] May 6, 1975

[54] FOCUSING DEVICE FOR CAMERA HAVING SELECTABLE FOCAL LENGTHS

[75] Inventors: Leonard F. Kamp; Edward J. Koval, both of Rochester, N.Y.

[73] Assignee: Eastman Kodak Company, Rochester, N.Y.

[22] Filed: June 10, 1974

[21] Appl. No.: 477,581

[52] U.S. Cl............................ 354/197; 355/55
[51] Int. Cl. ................................ G03b 13/18
[58] Field of Search ............ 354/195, 197; 352/139, 352/140; 355/55, 56, 57, 58, 59, 60, 61, 62, 63; 360/255

[56] References Cited
UNITED STATES PATENTS
3,185,061  5/1965  Westphalen ...................... 354/197
3,588,228  6/1971  Wilczynski......................... 350/255

FOREIGN PATENTS OR APPLICATIONS
1,095,541  12/1960  Germany .......................... 352/140

Primary Examiner—Samuel S. Matthews
Assistant Examiner—E. M. O'Connor
Attorney, Agent, or Firm—R. F. Brothers

[57] ABSTRACT

A camera includes a focusable primary lens, a selectively usable converter lens for changing the camera's effective focal length, and a movable focus member for adjusting the axial position of the primary lens. A cam member with two cam surfaces is movable with the focus member, and a pair of cam followers on the primary lens are arranged so that one of the followers abuts one of the cam surfaces when the converter lens is used and so that the other follower abuts the other cam surface with the converter lens is not used. The cam surfaces have different slopes so that the mechanical gain between the focus member and the primary lens changes when the converter lens is moved into and out of the camera's optical axis.

6 Claims, 4 Drawing Figures

FOCUSING DEVICE FOR CAMERA HAVING SELECTABLE FOCAL LENGTHS

BACKGROUND OF THE INVENTION

1. Field of the Invention

The present invention relates to cameras having a focusable primary lens and a converter lens which is selectively movable into the optical path to change the focal length of the optical system, and more particularly to a mechanism for focusing such cameras so that the optical system is always focused on objects spaced at the distance for which the focusing mechanism is set, regardless of whether or not the converter lens is in the optical path.

2. Description of the Prior Art

It is known to provide cameras with a primary lens of a predetermined focal length and with a converter lens movable into the optical axis of the camera to change (increase or decrease) the effective focal length of the optical system. Such cameras can be fix-focused or variable focus, and, if the latter, can be adjusted by axial movement of the primary lens. However, when a single focus adjustment mechanism, such as a focus scale or rangefinder, is used for the camera, complications may arise from the fact that the lens focusing mechanism must be designed to compensate for the different focal lengths since the distance that the primary lens must be moved in focusing is determined by the focal length of the lens group used. For instance, if the converter lens increases the magnification of the optical system, greater movement is required of the primary lens for a given change of focus distance than when the converter lens is out of the system.

This situation presents little concern if the camera is focused by a ground glass screen. However, if the operator must rely upon a scale or rangefinder to set the focus, it is evident that, if movement of the focus adjustment mechanism from one setting to the next always results in a predetermined movement of the primary lens regardless whether or not the converter lens was in use, the image would be out of focus in one of the situations.

This problem has been recognized in the past, and many solutions have been proposed for insuring that the image remains in focus when the camera's focal length is changed. For instance, U.S. Pat. No. 2,926,579 discloses an interchangeable lens camera having a plurality of focusing scales and means for automatically selecting the proper scale for the focal length of the lens system used. While such a mechanism solves the problem, it would obviously be more convenient and less complicated to provide the required compensation while employing a single scale. Of course, range-finder cameras could not use a mechanism such as disclosed in U.S. Pat. No. 2,926,579.

Other solutions shown in the prior art include cameras having a single focusing scale or rangefinder and incorporating means for changing the velocity ratio between the focusing device and the movable lens to compensate for a change in focal length. For example, German Pat. No. 1,095,541 discloses a motion picture camera having a focusable primary lens and a set of converter lenses movable into and out of the camera's optical axis. Each converter lens carrier has a characteristic cam which cooperates with the primary lens focusing system in a manner such that movement of the focusing member along a fixed scale by a given distance will result in axial movement of the primary lens by a distance both determined by the cam characteristics and proper for focusing a lens system of that particular focal length.

The mechanism of the German Patent is intended for use on motion pictures cameras which, by their nature, are large compared to popular still cameras presently on the market, such as for example, cameras adapted to receive size 110 film cartridges. Since the mechanism is intended for use on larger apparatus, it is quite bulky and not readily suitable for smaller photographic products.

SUMMARY OF THE INVENTION

Accordingly, it is an object of the present invention to provide a focusing device for use in small cameras which would compensate for the change in focal length of a lens system having a converter lens as described, so that the operator may set the camera focus by reference to a single scale, the same scale being used whether or not the converter lens is in the optical system. Of course, the inventive contribution herein described would be equally applicable to cameras having rangefinders instead of or in addition to focusing scales.

In keeping with the above object, the illustrated embodiment of a camera according to the present invention includes an axially movable primary lens, a converter lens shiftable into and out of axial alignment with the primary lens and a movable focus member with a cam member operatively connected to the focus member for movement therewith. The cam member has first and second cam surfaces of different slopes. First and second cam followers, integral with the primary lens, are arranged so that one of the cam followers abuts the first cam surface when the converter lens is out of alignment with the primary lens and the other cam follower abuts the second cam surface when the converter lens is in alignment with the primary lens. By this simple arrangement, when the focus member is moved a given distance, the primary lens will move one distance if the converter lens is axially aligned with the primary lens and a different distance if the converter lens is not so aligned with the primary lens.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing in which.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figures 1, 2:
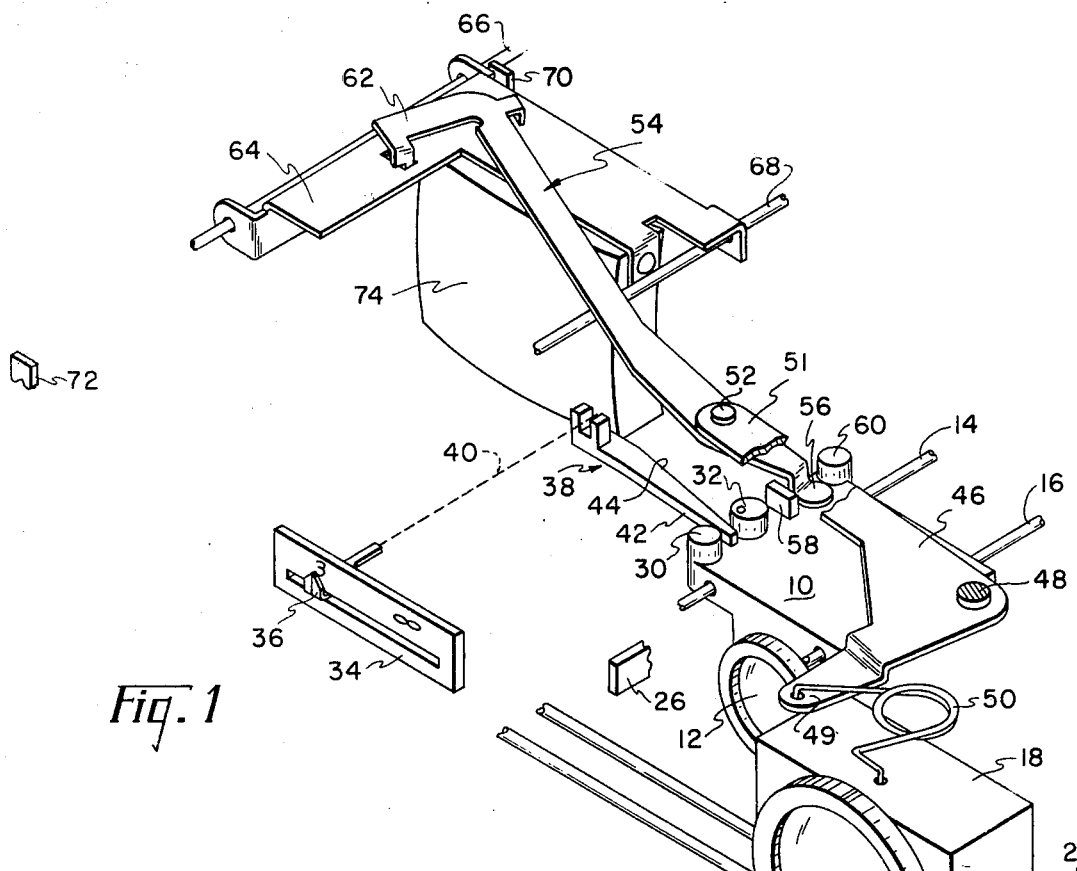
FIG. 1 is a perspective view of a portion of the camera in accordance with the present invention.
FIG. 2 is a top view of the portion of the camera shown in FIG. 1.

Referring to FIGS. 1 and 2, a portion of a camera has been illustrated, much of the mechanism unrelated to the present invention having been omitted for purposes of clarity. A lens housing 10 carries a primary lens 12 and is slidably mounted for movement along the axis of lens 12 (the optical axis of the camera) on a pair of rods 14 and 16. Lens 12 may, of course, be a lens group, and is shown as a single lens element for simplicity. Therefore, when we hereinafter refer to a primary lens, we intended that reference be to either a single lens element or to a lens group. Primary lens housing 10 has a stud or cam follower 30 and an eccentrically mounted stud or cam follower 32 extending upwardly therefrom. Eccentric stud 32 may be used for factory adjustment as will be later explained.

A second lens housing 18 is slidably mounted for movement perpendicular to the axis of lens 12 on rods 20 and 22 so that a converter lens 24 carried in housing 18 may be aligned with lens 12 and moved laterally out of such alignment. Movement of housing 18 is limited by stops 26 and 28 on the camera housing.

A focusing scale 34 is rigidly mounted on the outside of the camera housing, and a manually movable focus member or scale pointer 36 extends through the housing for manual focusing. The camera may include a rangefinder focusing mechanism of any known form instead of or in addition to scale 34 and pointer 36.

A wedge-shaped projection 38 is operatively connected to the focus member for movement therewith, such connection being schematically shown at 40. Wedge-shaped projection 38 has a pair of ramped cam surfaces 42 and 44, the shape of which can be best seen in FIG. 2. The projection and these cam surfaces extend between studs 30 and 32.

A two-armed lever 46 is rotatably mounted on a fixed stud 48. One arm 49 of the lever carries one end of a torsion spring 50, the other end of which is attached to converter lens housing 18. As shown in FIGS. 1 and 2, when the lens housing is out of the camera's optical axis (against stop 28) the force of spring 50 urges the lens housing against stop 28 and tends to rotate lever 46 in a clockwise direction as viewed in FIG. 2.

The other arm 51 of lever 46 is rotatably pinned at 52 to another lever 54. Lever 54 has one end 56 which is positioned between two studs 58 and 60 on primary lens housing 10. The other end 62 of lever 54 extends through an opening in a viewfinder lens carrier 64 which is slidably mounted on rods 66 and 68 for movement between stops 70 and 72. A lens element 74 of the viewfinder (the other elements of which have not been shown) is moved axially to vary the image and the field of view of the finder as lens carrier 64 moves between its stops.

OPERATION

The camera, with the elements arranged as shown in FIGS. 1 and 2, is set for taking a picture through primary lens 12, converter lens 24 being moved to a position spaced laterally of the camera's optical axis. The camera is focused at three feet as shown by the position of pointer 36 on scale 34. Spring 50 holds converter lens housing 18 against stop 24 and also tends to rotate two-armed lever 46 in a counterclockwise direction. This urges end 56 of lever 54 against stud 60 so that lever 54 tends to rotate about stud 60 in a clockwise direction, moving viewfinder lens carrier 64 against stop 70.

Pressure from end 56 of lever 54 against stud 60 moves primary lens carrier 10 rearwardly in the camera until stud 30 contacts cam surface 42. As the focusing member or pointer 36 is moved along scale 34 toward the infinity setting, wedge-shaped member 38 follows, and stud 30 follows cam surface 42 so that primary lens housing 10 is moved rearwardly in the camera by the force of spring 50 acting through lever 46 and lever 54.

Figure 3:
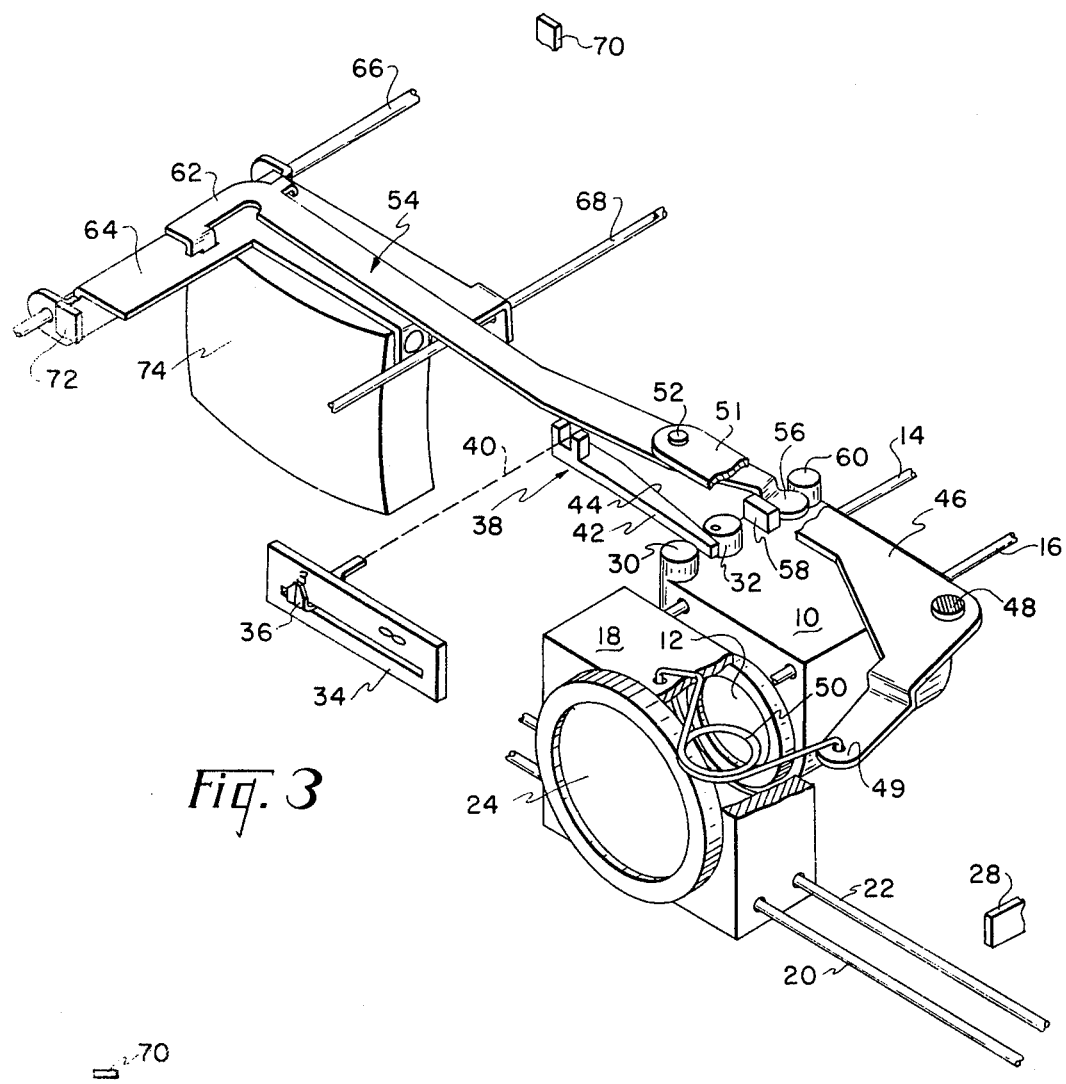
FIG. 3 is a view similar to FIG. 1 with some camera parts in another position.
Figure 4:
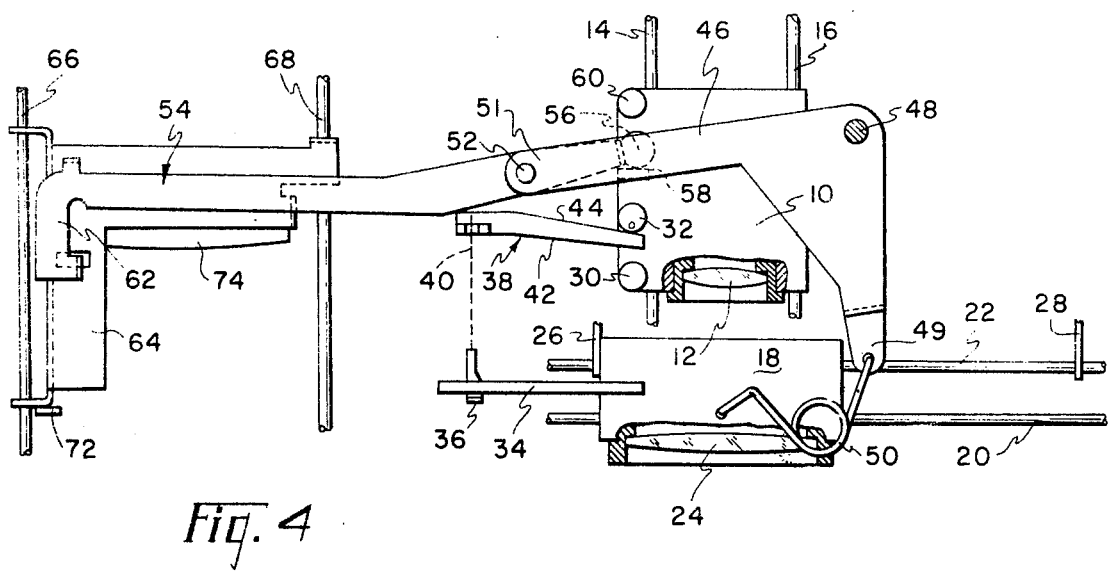
FIG. 4 is a top view of the camera as shown in FIG. 3.

Now, when it is desired to change the focal length of the camera, for instance to change from standard or wide-angle to telephoto in the illustrated embodiment, converter lens housing 18 is moved towards stop 26 so that converter lens 24 aligns with primary lens 12. Such movement may be effected in many ways, such as by a lever extending through the camera casing, and we have not illustrated means for moving the lens. Referring now to FIGS. 3 and 4, it can be seen that, upon the converter lens housing being moved toward stop 26, the force of spring 50 is reversed so that it now tends to move the converter lens housing to the left, or toward stop 26, and to rotate two-armed lever 46 in a counterclockwise direction. This moves end 56 of lever 54 into contact with stud 58 and causes lever 54 to rotate about stud 58, also in a counterclockwise direction, moving viewfinder lens carrier 64 forward in the camera until it engages stop 72, thereby narrowing the field of view of the viewfinder image so that the viewed image corresponds to the image on the camera's film plane.

By pressing against stud 58, end 56 of lever 54 causes primary lens housing 10 to move forward in the camera until stud 32 engages cam surface 44. Now, as focus member 36 is moved along scale 34, primary lens housing 10 will follow cam surface 44 rather than cam surface 42.

It can be seen that by the present invention, we have provided a mechanism wherein the same focus scale can be used regardless of the selected lens system, and that the mechanical gain of the focus system is varied in accordance with that selection so that the camera optics will be properly focused in accordance with the scale reading regardless of optical power.

In the preferred embodiment, the optics have been selected so that no shift of lens 12 is required to maintain focus when changing from standard to telephoto at the infinity setting. Accordingly, during assembly of the camera, the focus member is set at infinity with converter lens removed from the camera's optical axis. Then, eccentric stud 32 is rotated to take up any spacing between it and cam surface 44. When stud 32 is fixed in this position, there will be contact between stud 30 and cam surface 42 and between stud 32 and cam surface 44 whenever the camera is focused at infinity.

The invention has been described in detail with particular reference to a preferred embodiment thereof, but it will be understood that variations and modifications can be effected within the spirit and scope of the invention.

We claim:

1. In a camera having an axially movable primary lens, a converter lens movable into and out of axial alignment with said primary lens, and a movable focus member; the improvement comprising:

a cam member operatively connected to said focus member for movement therewith, said cam member having first and second cam surfaces of different slopes;

first and second cam followers integral with said primary lens; and spring means for (1) urging said first cam follower into abutment with said first cam surface when said converter lens is out of axial alignment with said primary lens and (2) urging said second cam follower into abutment with said second cam surface when said converter lens is in axial alignment with said primary lens, whereby, when said focus member is moved a given distance, said primary lens will move one distance if the converter lens is axially aligned with the primary lens and different distance if the converter lens is not so aligned with the primary lens.

2. The improvement as defined in claim 1 wherein said cam member comprises a wedge-shaped projection, said first and second cam surfaces being opposed sides of said projection.

3. The improvement as defined in claim 2 wherein: said first and second cam followers are spaced apart by a predetermined distance; and said wedge-shaped projection fills said predetermined distance when the camera is focused to infinity, whereupon said first and second cam surfaces are in contact with said first and second cam followers, respectively.

4. The improvement as defined in claim 1 wherein said spring means includes a single spring interconnecting said converter lens and said primary lens.

5. The improvement as defined in claim 1 further comprising first and second stops, said first stop defining the limit of travel of said converter lens when moved out of axial alignment with said primary lens and said second stop defining the limit of travel of said converter lens when moved into axial alignment with said primary lens.

6. The improvement as defined in claim 5 wherein said spring means is arranged to (1) urge said converter lens against said first stop when urging said first cam follower into abutment with said first cam surface and (2) urge said converter lens against said second stop when urging said second cam follower into abutment with said second cam surface.

* * * * *

UNITED STATES PATENT OFFICE
CERTIFICATE OF CORRECTION

PATENT NO. : 3,882,520
DATED : May 6, 1975
INVENTOR(S) : Leonard F. Kamp     Edward J. Koval It is certified that error appears in the above-identified patent and that said Letters Patent are hereby corrected as shown below:

Title Page, in the Abstract in line 10, Delete "with", and substitute therefor --when--

Signed and Sealed this fourteenth Day of October 1975

[SEAL]

Attest:

RUTH C. MASON
*Attesting Officer*

C. MARSHALL DANN
*Commissioner of Patents and Trademarks*